United States Patent [19]
Katagiri et al.

[11] 3,898,116
[45] Aug. 5, 1975

[54] METHOD AND APPARATUS FOR MANUFACTURING A STRUCTURE FOR A GREEN TIRE

[75] Inventors: Yoshiaki Katagiri; Yoshiaki Hirata; Toshihiro Takahashi; Shunichi Nomura, all of Tokyo, Japan

[73] Assignee: Bridgestone Tire Company Limited, Tokyo, Japan

[22] Filed: Nov. 5, 1973

[21] Appl. No.: 412,724

[30] Foreign Application Priority Data
Nov. 9, 1972  Japan............................ 47-112286

[52] U.S. Cl................ 156/134; 156/123; 156/265; 156/266; 156/355; 156/406; 156/512; 156/555
[51] Int. Cl.².................... B29H 17/20; B32B 31/18
[58] Field of Search....... 156/123, 123 A, 132, 133, 156/134, 355, 405, 406, 264, 265, 266, 517, 519, 510, 511, 512, 502, 539, 543, 553, 555

[56] References Cited
UNITED STATES PATENTS

| | | | |
|---|---|---|---|
| 1,398,749 | 11/1921 | Stevens | 156/266 X |
| 2,962,083 | 11/1960 | Hasselquist | 156/405 |
| 3,024,829 | 3/1962 | Cooper | 156/128 I |
| 3,142,603 | 7/1964 | Parshall et al. | 156/517 X |
| 3,616,081 | 10/1971 | Cantarutti | 156/502 |
| 3,630,803 | 12/1971 | Printz | 156/405 |

FOREIGN PATENTS OR APPLICATIONS

| | | | |
|---|---|---|---|
| 1,198,820 | 7/1970 | United Kingdom | 156/133 |
| 224,937 | 10/1958 | Australia | 156/502 |
| 634,320 | 1/1962 | Canada | 156/502 |

*Primary Examiner*—Clifton B. Cosby
*Attorney, Agent, or Firm*—Waters, Schwartz & Nissen

[57] ABSTRACT

Method and apparatus for manufacturing a carcass structure for a green tire, wherein a plurality of carcass sheets are respectively cut into pieces each having a length substantially equal to the circumferential length of the working surface of the building drum and the pieces are laminated on one another before being wrapping on the building drum.

5 Claims, 13 Drawing Figures

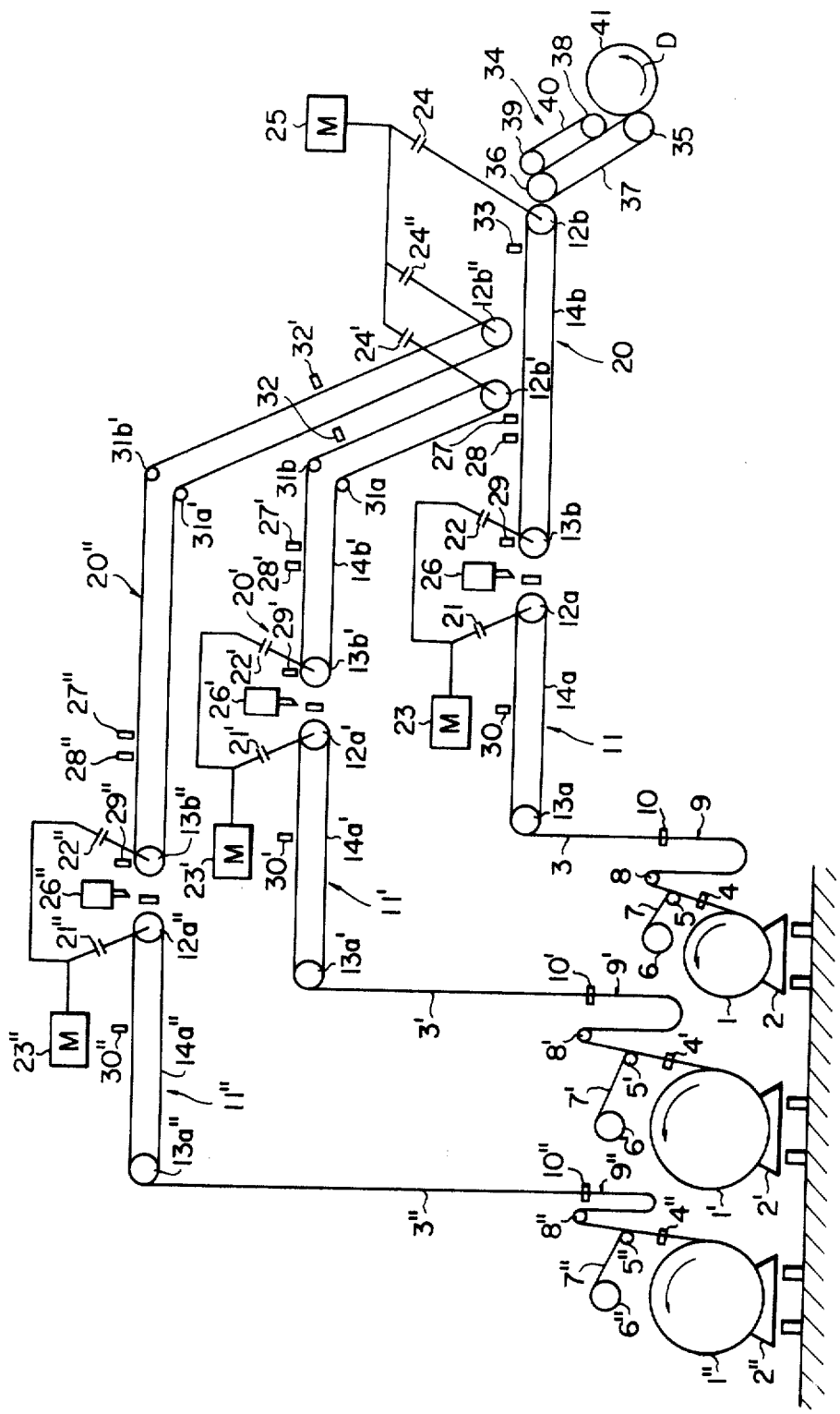

METHOD AND APPARATUS FOR MANUFACTURING A STRUCTURE FOR A GREEN TIRE

The present invention relates in general to the art of pneumatic tire manufacture and in particular is concerned with a method and apparatus for manufacturing a carcass structure for a green tire by wrapping tire components on a building drum.

Typical one of green tire manufacturing process where a building drum is utilized includes the steps of preparing a plurality of carcass sheets of rolled type, cutting the carcass sheets into pieces each having "one-turn length" which means in this specification a length slightly larger than the circumferential length of the working surface of the building drum, and wrapping sequentially the pieces on the working surface of the building drum in such a manner that overlapping portions of the "one-turn length" pieces are spaced circumferentially equidistantly from each other for the purpose of forming a green tire of a preferred quality and performance. Since, heretofore, the above-stated process has been performed by manual trades, difficulty has been encountered in that the manual trades necessitates manual dexterity and is achieved at much low work performance efficiency. Furthermore, when the bias type ply cords each including a number of junctions are used for the particular process, it is necessary to form the one-turn length pieces each having no junction near its either forward or backward end.

It is accordingly a principal object of the present invention to provide a new and improved method of manufacturing a carcass structure for a green tire, which includes forming a plurality of carcass sheets into one-turn length pieces and laminating the pieces on one another in a desired manner prior to wrapping the pieces on the building drum.

It is another object of the invention to provide a new and improved apparatus of manufacturing a carcass structure for a green tire which is capable of manufacturing a carcass structure without necessity of manual trade of the operator.

For a full understanding of the invention, a detailed description in a preferred form will now be given in connection with the accompanying drawings and the features forming the invention will be specifically pointed out in the claims.

In the drawings:

FIG. 1 is a schematic diagram of an apparatus according to the present invention, wherein a fixed frame or base for supporting various parts is not illustrated for the simplicity of illustration;

Figure 2A:
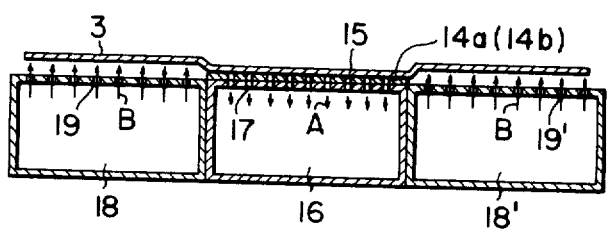
FIG. 2A is a cross sectional view of a part of the apparatus of FIG. 1.

Referring now to the drawings and more specifically to FIG. 1 thereof, there is shown an apparatus according to the present invention, which comprises first, second and third laminated carcass sheets 1, 1' and 1'' of rolled type. Each laminated carcass sheet is composed of a carcass sheet and a liner sheet for preventing overlapping portions of the carcass sheet from adhering to each other when the carcass sheet is rolled. The liner sheet may be made of cotton, synthetic resin fabric, etc. The rolled laminated carcass sheets 1, 1' and 1'' are placed on support bases 2, 2' and 2'' positioned on a floor. The rolled laminated carcass sheet, which is designated by 3, is withdrawn through a photo-detector 4 positioned near the support base 2, by drive rollers 5, 6 and 8 which are actuated by an actuation mechanism (not shown). The drive roller 6 reels the liner sheet which is now designated by 7 so as to separate the carcass sheet from the liner sheet 7. The carcass sheet 3 is withdrawn by way of photo-detector 10 by a basic supplying conveyer 11, while forming a festoon 9. The photo-detector 10 is connected to a controller (not shown) which actuates the drive rollers 5, 6 and 8, when the festoon 9 rises above the photo-detector 10. Although being not shown in this figure, there is provided in the vicinity of forward end of the basic supplying conveyer 11 a centering mechanism for centering the carcass sheet 11. The basic supplying conveyer 11 includes a pair of conveyer drums 12a and 13a, and a flat loop belt 14a stretched over the pair of conveyer drums 12a and 13a. As clearly shown in FIG. 2A, the belt 14a preferably has a number of apertures 15 and the conveyer 11 further includes a vacuum chamber 16 interposed between the lower and upper parts of the flat loop belt 14a and having an upper wall with a number of apertures 17 coextensively confronting the lower surface of the upper part of the flat loop belt 14a, a first high pressure air chamber 18 placed at one side of the vacuum chamber 16 and having an upper wall with a number of apertures 19 coextensive and flush with the upper wall of the vacuum chamber 16, a second high pressure air chamber 18' placed at the other side of the vacuum chamber 16 and having an upper wall with a number of aperture 19' being coextensive and flush with the upper wall of the vacuum chamber 16. With the above-stated arrangement, the air flows in such manners as indicated by arrows A, B and B', so that the carcass sheet 3 mounted on the conveyer 11 has its central portion attracted onto the flat belt 14a and its side portions lifted as shown in FIG. 2A. It should now be appreciated that since the conveyer 11 is constructed as above-mentioned, the friction between the surface of the conveyer 11 and the carcass sheet 3 although the width of the flat loop belt 14a is so small as to be desirable for reducing power necessary for actuating the conveyer 11. It is to be noted that the inner surface of the flat loop belt 19, and the upper walls of the low pressure air chamber 16 and the high pressure air chambers 18 and 18' may be coated with teflon resin so as to reduce the friction coefficient between these portions.

A basic laminating conveyer 20 is positioned in alignment with the basic supplying conveyer 11, for feeding the carcass sheet 3 led from the basic supplying conveyer 11. The basic laminating conveyer 20 has the same construction as the basic supplying conveyer 11. The drum 12a of the basic supplying conveyer 11 and a conveyer drum 13b of the basic laminating conveyer 20 are respectively connected by way of clutches 21 and 22 to an output shaft of a prime mover 23. The conveyer drum 12b of the basic laminating conveyer 20 is, on the other hand, connected by way of a clutch 24 to an output shaft of a prime mover 25. A first cutting device 26 is so interposed between the forward end of the basic supplying conveyer 11 and the backward end of the basic laminating conveyer 20 as to allow the carcass sheet 3 fed by the basic supplying conveyer 11 to pass between a pair of blades thereof. The cutting device 26 is so arranged as to transversely cut off the carcass sheet 3 when it is energized. The blades of the cutting device 26 is preferably angled from a plane perpendicular to the moving direction of the carcass sheet in order to perform the "bias cutting". A photodetector 27 is placed over the basic laminating conveyer 20, for producing a cutting signal when the forward end of the carcass sheet 3 reaches a preselected point spaced from the cutting device 26 by a distance substantially equal to the one-turn length. A first actuation circuit (not shown) is electrically connected to the detector 27, which is so arranged as to decouple the clutches 21 and 22 and to energize the cutting device 26. In order to desirably stop the conveyers 11 and 20, a subsidiary photo-detector 28 may be placed backward of the photo-detector 27 and the actuation circuit is so arranged as to reduce the speed of the prime mover 23 upon receipt of a signal from the subsidiary photo-detector 28. A photo-detector 29 is placed over the basic laminating conveyer 20, which is so arranged as to produce a first gate signal when the forward end of the carcass sheet reaches a preselected point forwardly spaced from the cutting device 26 by a predetermined length *l*. The predetermined length *l* is preferably shorter than one-half of the one-turn length. A detector 30 placed over the basic supplying conveyer 11 which is so arranged as to produce an actuation signal when it detects at least one junction appearing in backward and forward end portions of the carcass sheet 3 each portion having a length equal to the predetermined length *l*, the backward edge of the backward end portion and the forward edge of the forward end portion being spaced from each other by the one-turn length. A second actuation circuit (not shown) is electrically connected to the detectors 29 and 30, which is so arranged as to decouple the clutches 21 and 22 and to energize the cutting device 26.

Figure 2B:
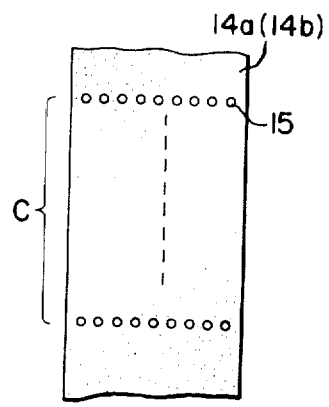
FIG. 2B is a fragmentary view of a part of the apparatus of FIG. 1.

The laminated carcass sheet 1' is devided into a carcass sheet 3' and a liner sheet 7' by drive rollers 5', 6' and 8' which are arranged in the same manner as the drive rollers 5, 6 and 8. The carcass sheet 3' is withdrawn through photo-detectors 4' and 10' while forming a festoon 9'. The carcass sheet 3' is carried by a first additional supplying conveyer 11' which is vertically spaced from the basic supplying conveyer 11 and having the same parts 12a', 13a', 14a', etc. as the basic supplying conveyer 11. A first additional laminating conveyer 20' is positioned in alignment with the first additional supplying conveyer 11'. The additional laminating conveyer 20' includes a pair of conveyer drums 12b' and 13b', and a flat loop belt 14b' stretched over the conveyer drums 12b' and 13b'. The first additional laminating conveyer 20' has the same construction as the basic laminating conveyer 20 except that the flat loop belt 24b' has one or more groups of apertures 15 each group locating at such ristricted portions as indicated by a reference character C in FIG. 2B, each of the portions extending through a length substantially equal to the one-turn length in the moving direction of the belt 14b'. The conveyer drum 12b' is positioned in close proximity of the upper surface of the basic laminating conveyer 20. In order to maintain substantially horizontal the flat loop belt 14b' near the conveyer drum 13b', a pair of idle rollers 31a and 31b is provided over which the flat loop belt 14b' is stretched. The conveyer drums 12a' and cutt b' are connected by way of clutches 21' and 22' to an output shaft of a prime mover 23'. The conveyer drum 12b' is, on the other hand, connected by way of a clutch 24' to the prime mover 25. A cutting device 26' is so interposed between the forward end of the additional supplying conveyer 11' and the backward end of the additional laminating conveyer 20' as to pass between a pair of blades thereof. The cutting device 26' is so arranged as to transversely cut off the carcass sheet 3', when it is energized. The blades of the cutting device 26' is angled in the same manner as the blades of the cutting device 26. Photo-detectors 27' and 28' are positioned in the same manner as the photo-detectors 27 and 28 and connected to the cutting device 26' by means of an actuation circuit (not shown) which is so arranged as to energize the cutting device 26' in response to cutting signals generated from the photo-detectors 27' and 28'. A photo-detector 29' is positioned in the vicinity of the cutting device 26', which is so arranged as to produce a gate signal when the forward end of the carcass sheet 3' reaches a preselected point forwardly spaced from the cutting device 26' by the predetermined distance *l*. A detector 30 is positioned over the first additional supplying conveyer 11' which is so arranged as to produce an actuation signal when it detects a junction appearing in backward and forward end portions of the carcass sheet 3'. An actuation circuit (not shown) is electrically connected to the detectors 29' and 30' for energizing the cutting device 26' in response to the gate signal from the detector 29' and the actuation signal from the detector 30'. A photo-detector 32 is placed over a sloped portion of the additional laminating conveyer 20', which detector is so arranged as to produce a start signal when the forward end of the carcass sheet 3' reaches a preselected point. The start signal from the photo-detector 32 is applied to a circuit (not shown) which then permits the clutch 24' to engage.

The laminated carcass sheet 1'' is divided into a carcass sheet 3'' and a liner sheet 7'' by drive rollers 5'', 6'' and 8'' which are arranged in the same manner as the drive rollers 5, 6 and 8. The carcass sheet 3'' is withdrawn through a photo-detectors 4'' and 10'' while forming a festoon 9''. The carcass sheet 3'' is conveyed by a second additional supplying conveyer 11'' which is vertically spaced from the first additional supplying conveyer 11' and having the same parts 12a'', 13a'', 14a'', etc. as the first additional supplying conveyer 11'. A second additional laminating conveyer 20'' is positioned in alignment with the second additional supplying conveyer. The additional laminating conveyer 20'' includes a pair of conveyer drums 12b'' and 13b'', and a flat loop belt 14b'' stretched over the conveyer drums 12b'' and 13b''. The conveyer drum 12b'' is positioned apart from the conveyer drum 12b' of the first additional laminating conveyer 11' and in close proximity to the upper surface of the additional laminating conveyer 20. A pair of idle rollers 31a' and 31b' are provided for the same purpose of the rollers 13a and 13b in the case of the first additional laminating conveyer 20'. The conveyer drums 12a'' and 13b'' are connected by way of clutches 21'' and 22'' to an output shaft of a prime mover 23''. The conveyer drum 12b'' is connected by way of a clutch 24'' to the prime mover 25. A cutting device 26'' is so interposed between the conveyers 11'' and 20'' as to pass between a pair of blades thereof. The cutting device 26'' is so arranged as to transversely cut the carcass sheet 3'', when it is energized. The blades of the cutting device 26'' is angled in the same manner as the blades of the cutting device 26'. Photo-detectors 27'' and 28'' are positioned in the same manner as the photo-detectors 27 and 28 and connected to the cutting device 26'' by means of an actuation circuit (not shown) which is so arranged as to energize the cutting device 26'' in response to cutting signals from the photo-detectors 27'' and 28''. Detectors 29'' and 30'' respectively having the same function as detectors 29' and 30' are provided with the second additional supplying and laminating conveyers 11'' and 20'' in the same manner as the first additional supplying and laminating conveyers 11' and 20'. The photo-detectors 29'' and 30'' are associated with the cutting device 26'' in the same manner as the detectors 29' and 30' and the cutting device 26'. A photo-detector 32' is placed over a sloped portion of the second additional laminating conveyer 20', which photo-detector 32' is so arranged as to produce a start signal when the forward end of the carcass sheet 3'' reaches a preselected point. The start signal from the photo-detector 32' is applied to a circuit (not shown) which then permits the clutch 24'' to engage. A photo-detector 33 is placed over the basic laminating conveyer 20, which is so arranged as to produce a stop signal when the forward end of the carcass sheet 3'' reaches a preselected point.

An applying and pressing conveyer 34 is provided which includes a lower part having a pair of drums 35 and 36 spaced from each other and a flat loop belt 37 stretched over the drums 35 and 36, and an upper part having a pair of drums 38 and 39, and a flat loop bett 49 stretched over the drums 38 and 39. The lower and upper parts are placed closely to each other. The drum 36 is placed near the drum 12 of the basic laminating conveyer 20. The applying and pressing conveyer 34 is arranged to be rotatable about an axis of the drum 36. The applying and pressing conveyer 34 is rotated by means of an actuation means (not shown) until its forward end portion abuts onto the working surface of a building drum 41 which is so arranged as to be rotatable in such a direction as indicated by an arrow D.

The operation of the above-stated apparatus will be explained hereinbelow, in case the carcass sheet 3 is a breaker and the carcass sheets 3' and 3'' are first and second ply cords of bias type.

While threading the drive rollers, the breaker 3, and the first and second ply cords 3' and 3'' have their forward ends respectively extended to the basic supplying conveyer 11 and the first and second supplying conveyers 11' and 11''. The prime movers 23, 23' and 23'', which may be electric motors, are then energized and the clutches 21, 22, 21' 22', 21'' and 22'' are actuated to engage, so that the supplying conveyers 11, 11' and 11'' convey the breaker 3, and the first and second ply cords 3' and 3'' toward the building drum, that is, in the forward direction. Since, in this instance, the breaker 3 includes no junction, the photo-detector 30 does not generate the actuation signal, so that the conveyers 11 and 20 convey the breaker 3 without stopping until the forward end of the breaker 3 reaches the point spaced from the cutting device 26 by the one-turn length. Then, the detectors 27 and 28 produce cutting signals which are applied to the first actuation circuit. The first actuation circuit makes the clutches 21 and 22 to disengage and energize the cutting device 26 which then cut the breaker 3 into a piece of one-turn length.

Figure 3:
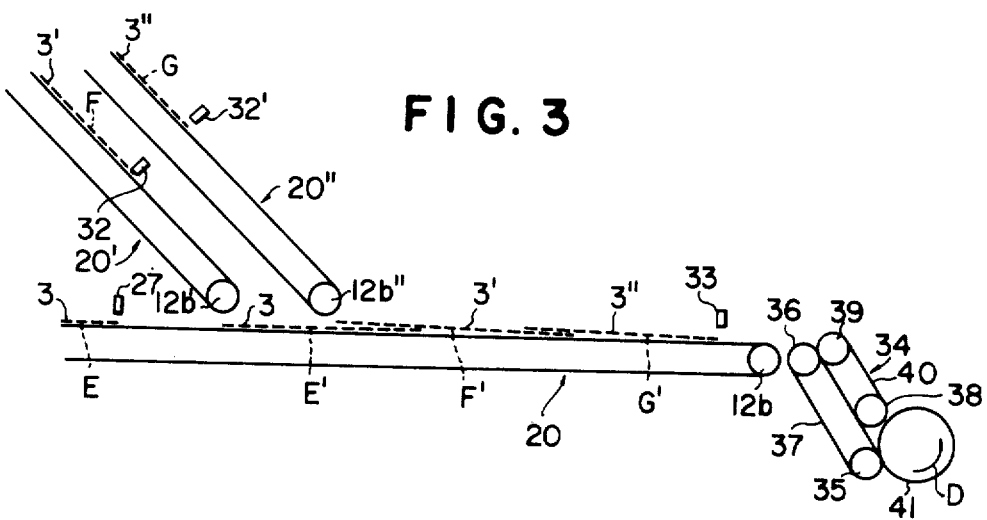
FIG. 3 is an explanatory view for explaining the operation of the apparatus of FIG. 1.
Figure 4:
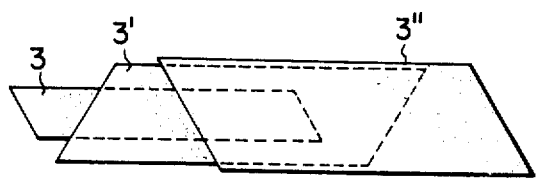
FIG. 4 is a diagram showing the laminated pieces formed by the apparatus of FIG. 1.
Figure 5:
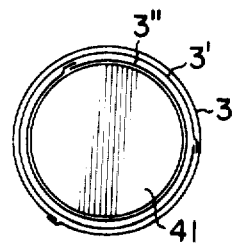
FIG. 5 is an explanatory view showing a cross section of a building drum on which a plurality of carcass sheets are wrapped.

When, on the other hand, the photo-detector 30' does not detect any junction, the ply cord 3' is cut into a piece of one-turn length by the cooperation of the detectors 27' and 28' and the cutting device 26'. When the cutting device 26' completes its operation, the clutch 22' is actuated to engage until the forward end of the piece reaches the point where the detector 32 produces the stop signal. When the photo-detector 30'' does not detect any junction, the detectors 27'', 28'', the cutting device 26'', etc. cooperates in the same manner as the detectors 27', 28', the cutting device 26', etc., so that a piece of the ply cord 3'' is conveyed until its forward end reaches the preselected point where the detector 32' produces the stop signal. Thus, the pieces of the breaker 3, the first and second ply cords 3' and 3'' are so positioned as indicated by broken lines E, F and G in FIG. 3. It is now to be noted that the clutch 22' and 22'' are so actuated that the pieces of the first and second ply cords 3' and 3'' are respectively placed just on the localized apertures 15 of the belts 14b' and 14b'' of the conveyers 20' and 20'', whereby the pieces are fixedly mounted on the conveyers 20' and 20'' even when the pieces 3' and 3'' are on the sloped portion of the conveyers 20' and 20''. Thereafter, the clutches 24, 24' and 24'' are simultaneously actuated to engage, so that the conveyers 20, 20' and 20'' are simultaneously driven. When the forward end of the piece of second ply cord 3'' reaches beneath the detector 33, the detector 33 produces the stop signal thereby causing the clutches 24, 24' and 24'' to disengage with the result that the piece of breaker 3, and the piece of first and second ply cords 3' and 3'' are laminated on one another in such a manner as indicated by broken lines E', F' and G' in FIG. 3. FIG. 4 is a plan view of the laminated pieces of breaker and first and second ply cords 3, 3' and 3''. As clearly seen from FIG. 4, the forward end of the pieces of breaker 3, and the first and second ply cords 3' and 3'' spaced from one another by a distance corresponding to an angle of 120°. Thereafter, the building drum 41 is placed at a desired position and the applying and pressing conveyer 34 is rotated about the axis of the drum 36 until the forward end portion of the lower part of the conveyer 34 abuts onto the working surface of the building drum 41. Then, basic laminating conveyer 20 is driven by engaging the clutch 24 and the applying and pressing conveyer 34 is also driven, while the building drum 41 rotates in the direction D, with the result that the laminated pieces 3, 3' and 3'' are wrapped on the working surface of the building drum 41 in such a manner as shown in FIG. 5. As seen from FIG. 5, the overlapping portions of the pieces 3, 3' and 3'' are circumferentially equidistantly spaced from each other.

Figure 6A:
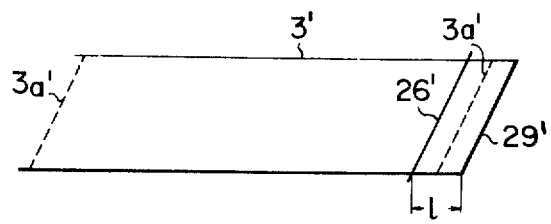
FIGS. 6A through 6F are diagrams for explaining the operation of the apparatus of FIG. 1.

When, for example, the first ply cord 3' includes a junction 3a' in the forward end portion of the predetermined length l as shown in FIG. 6A, the detector 30 produces the actuation signal. When, in this instance, the forward end of the ply cord 3' reaches the point where the detector 29' produces the gate signal, the conveyers 11' and 20' are stopped and the cutting device 26' is energized to cut off the forward end portion as shown in FIG. 6B. Upon completion of the operation of the cutting device 26', the ply cord 3' is conveyed until the forward end of the ply cord 3' reaches the point where the detector 27' produces the cutting signal. Then the ply cord 3' is cut transversely into a piece of one-turn length as shown in FIG. 6C. As seen from FIG. 6C, the piece of one-turn length now includes no junction in the forward and backward portions of the length $l$, whereby the quality and performance of the resultant green tire would not be degraded by the junctions the bias type ply cord inherently includes.

Figure 6D:
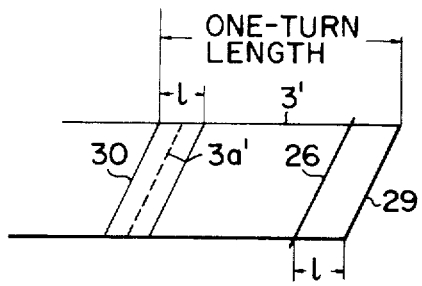
Figure 6B:
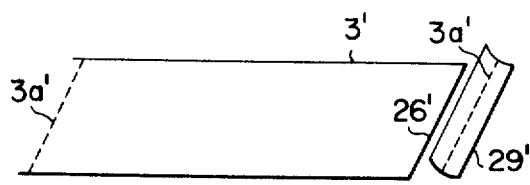
Figure 6E:
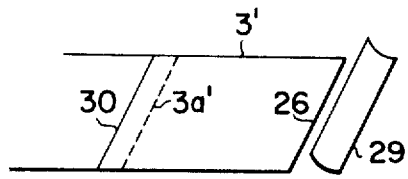
Figure 6C:
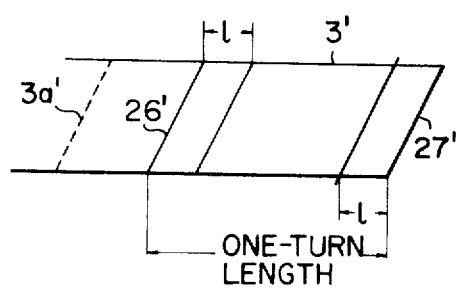
Figure 6F:
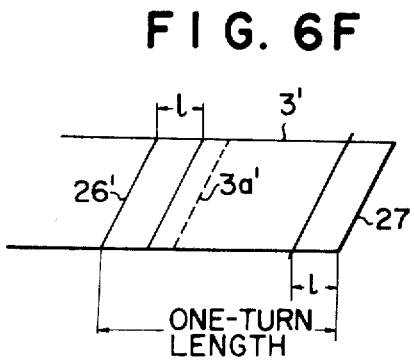

When, otherwise, the first ply cord 3' includes a junction 3a' in the backward portion of the length $l$ as illustrated in FIG. 6D, the photo-detector 30 also produces the actuation signal, so that the cutting signal 26' is energized to cut off the forward end portion of the length $l$ as illustrated in FIG. 6E. Upon completion of the operation of the cutting device 26', the ply cord 3' is conveyed until the forward end reaches the point where the detector 27 produces the cutting signal. Then, the cutting device 26' is again energized to cut the ply cord 3' into a piece of one-turn length as illustrated in FIG. 6F. As seen from FIG. 6F, the junction 3a' now locates outside of the backward end portion of the length $l$.

It should be understood that the photo-detectors 19'' and 30'' the cutting device 26'', etc. cooperate with one another in the same manner as above-mentioned, when the ply cord 3'' includes a junction in its backward or forward end of the length $l$.

Figure 7:
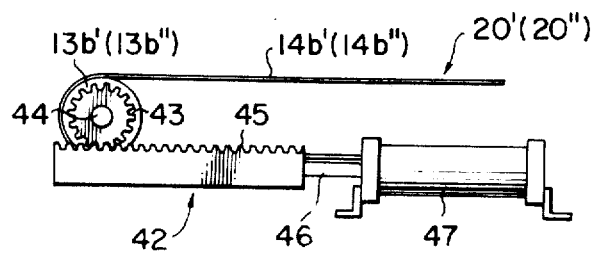
FIG. 7 is a diagram showing another part of the apparatus of FIG. 1.

Each of the first and second additional laminating conveyers 20' and 20'' may further include a reversing mechanism which is illustrated in FIG. 7. The reversing mechanism which is generally designated by a reference numeral 42 includes a pinion 43 connected to a shaft 44 of the conveyer drum 13b' (13b'') by way of a one-way clutch (not shown), and a rack 45 engaging with the pinion 43. The rack 45 is connected to a piston rod 46 of a fluid pressure operated cylinder assembly 47 mounted by means of a suitable means (not shown) on the conveyer 20' (20''). With the above-stated arrangement, the conveyer 20' (20'') is reversely driven when the cylinder assembly 47 is actuated.

When, in operation, the forward end portion of the ply cord 3' (3'') is cut off by the cutting device, the cylinder assembly 47 is actuated so as to reversely move the belt 14b' (14b''), whereby the piece of the ply cord 3' (3'') is desirably placed on the portion of the belt 14b' (14b'') where the apertures 15 locate.

It is now to be noted that although the apparatus of FIG. 1 includes two additional lines each including additional supplying and laminating conveyers, the apparatus of the invention may include only one additional line or otherwise any more additional lines.

Further, various types of detectors may be utilized in stead of the photo-detectors used in the apparatus of FIG. 1. Furthermore, the carcass sheet 3 may be a ply cord in some cases.

It should be appreciated that since the apparatus of the invention does not necessitate intermittent rotation of the building drum, it can manufacture a carcass structure of desired quality and performance at high work performance efficiency.

The detailed description of the preferred embodiment of the invention for the purpose of explaining the principles of the invention, as many modifications may be made by the exercise of skill in the art without departing from the spirit and scope of the invention.

What is claimed is:

1. A method of manufacturing a carcass structure for a green tire using a building drum, which is characterized by the steps of:

preparing at least two carcass sheet of bias type having a number of junctions;

cutting each one of said carcass sheets into a piece of the one-turn length, said cutting includes a step of cutting off a forward end portion of a predetermined length of said piece when there is at least one junction in said forward end portion and a backward end portion of said predetermined length, the backward edge of said backward end portion and the forward edge of said forward end portion being spaced from each other by the one-turn length;

laminating one of the pieces on the other piece in such a manner that the forward ends of the pieces circumferentially equidistantly spaced from each other when the laminated pieces are wrapped on the working surface of the building drum; and wrapping the laminated pieces on the working surface of the building drum.

2. An apparatus for manufacturing uncured carcass structure to be included with a building drum comprising:

a basic supplying conveyer for withdrawing a first carcass sheet;

a basic laminating conveyer positioned in alignment with said basic supplying conveyer for feeding said first carcass sheet led from said basic supplying conveyer, said basic laminating conveyer including a pair of drums spaced from each other, a flat loop belt with apertures stretched over said pair of drums, a vacuum chamber interposed between the lower and upper parts of said loop belt and having a perforated upper wall coextensively facing the lower surface of the upper part of said loop belt, a first high pressure air chamber placed at one side of said low pressure air chamber and having a perforated upper wall coextensive and flush with said perforated upper wall of said low pressure air chamber, a second high pressure air chamber placed at the other side of said low pressure air chamber and having a perforated upper wall coextensive and flush with said perforated upper wall of said low pressure air chamber, and actuation means for forwardly rotating said pair of drums;

a first cutting device interposed between the forward end of said basic supplying conveyer and the backward end of said basic laminating conveyer, for allowing said first carcass sheet to pass therethrough and for cutting transversely said first carcass sheet when it is energized;

a first detector placed over said basic laminating conveyer for producing a first cutting signal when the forward end of said first carcass sheet reaches a first point forwardly spaced form said first cutting device by the one-turn length;

a first actuation circuit responsive to said first cutting signal for energizing said first cutting device;

a second detector placed over said basic laminating conveyer for producing a first gate signal when the forward end of said first carcass sheet reaches a second point forwardly spaced from the first cutting device by a predetermined length shorter than one-half of the one-turn length;

a third detector placed over said basic supplying conveyer for producing a first actuation signal when it detects at least one junction appearing in backward and forward end portions each having a length equal to said predetermined length, the backward edge of said backward end portion and the forward edge of said forward end portion being spaced from each other by the one-turn length;

a second actuation circuit responsive to said first gate and actuation signals for energizing said first cutting device;

at least one additional supplying conveyer overlying said basic supplying conveyer for withdrawing a second carcass sheet of bias type;

at least one additional laminating conveyer positioned in alignment with said additional supplying conveyer for feeding said second carcass sheet led from said additional supplying conveyer, said additional laminating conveyer having its forward end placed in close proximity to the upper end of said basic laminating conveyer and including a pair of drums spaced from each other, a flat loop belt with apertures stretched over said pair of drums, a vacuum chamber interposed between the lower and upper parts of said loop belt and having a perforated upper wall coextensively facing the lower surface of the upper part of said loop belt, a first high pressure air chamber placed at one side of said low pressure air chamber and having a perforated upper wall coextensive and flush with said perforated upper wall of said low pressure air chamber, a second high pressure air chamber placed at the other side of said low pressure air chamber and having a perforated upper wall coextensive and flush with said perforated upper wall of said low pressure air chamber, and actuation means for forwardly rotating said pair of drums;

a second cutting device interposed between the forward end of said additional supplying conveyer and the backward end of said additional laminating conveyer for allowing said second carcass sheet to pass therethrough and transversely cutting said second carcass sheet when it is energized;

a fourth detector placed over said additional laminating conveyer for producing a second cutting signal when the forward end of said second carcass sheet reaches a third point forwardly spaced from said second cutting device by the one-turn length;

a third actuation circuit responsive to said second cutting signal for energizing said second cutting device;

a fifth detector placed over said additional laminating conveyer for producing a second gate signal when the forward end of said second carcass sheet reaches fourth point forwardly spaced from said second cutting device by said predetermined length;

a sixth detector placed over said additional supplying conveyer for producing a second actuation signal when it detects at least one junction appearing in backward and forward end portions each having a length equal to said predetermined length, the backward edge of said backward end portion and the forward edge of said forward end portion being spaced from each other by the one-turn length;

a fourth actuation circuit responsive to said second gate and actuation signals for energizing said second cutting device;

control means for actuating said basic and additional laminating conveyers so as to laminate said first and second carcass sheet on each other in such a manner that the forward ends of said first and second carcass sheets are spaced from each other by a predetermined distance; and an applying and pressing conveyer having its backward end positioned near the forward end of said basic laminating conveyer and its forward end positioned in close proximity to the working surface of the building drum for applying and pressing the laminated carcass sheets onto the working surface of the building drum thereby to permit the building drum to form a carcass structure thereon.

3. The apparatus as defined in claim 2, wherein said control means includes a seventh detector positioned over said additional laminating conveyer for producing a start signal when the forward end of said second carcass sheet passes through a predetermined point, and means for actuating both of said basic and additional laminating conveyers in response to said start signal and said first cutting signal.

4. The apparatus as defined in claim 2, wherein said actuation means includes a reversing mechanism for reversely driving one of said pair of drums.

5. The apparatus as defined in claim 2, wherein said flat loop belt of said additional laminating conveyer has apertures localized in a portion thereof extending through one-turn length in the moving direction thereof.

* * * * *